Aug. 17, 1926.

H. L. MASSER 1,596,441

VOLUME INTEGRATOR

Filed Dec. 23, 1925　　2 Sheets-Sheet 1

Aug. 17, 1926.
H. L. MASSER
1,596,441
VOLUME INTEGRATOR
Filed Dec. 23 1925    2 Sheets-Sheet 2
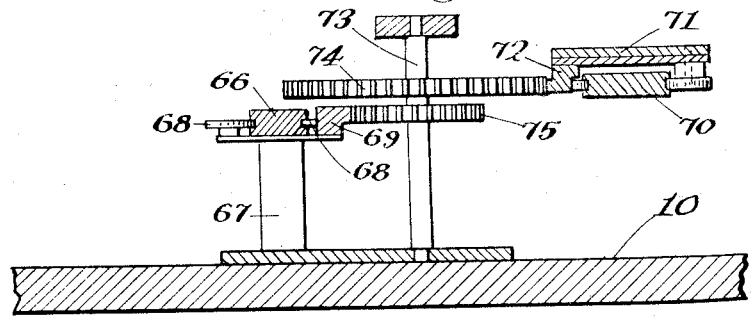
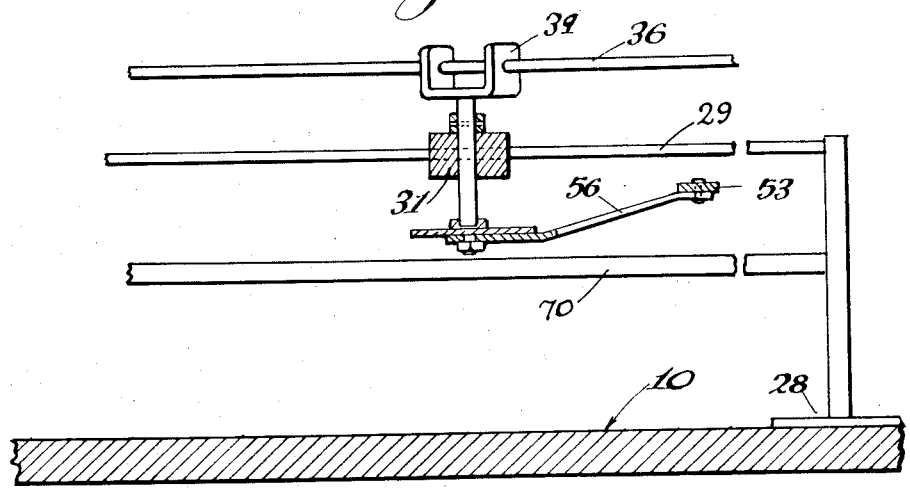
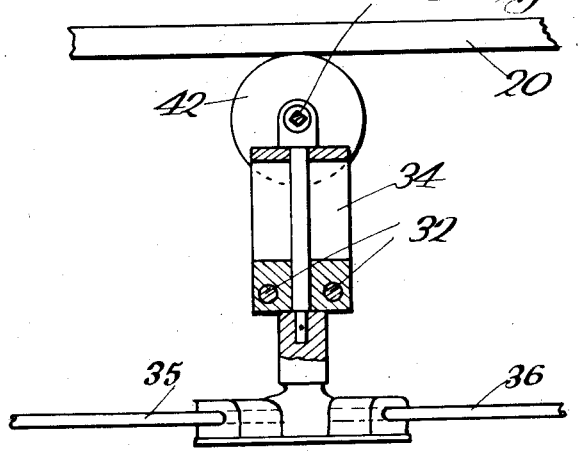
Inventor
Harry L. Masser
by Hazard and Miller
Attorneys Patented Aug. 17, 1926.

1,596,441

UNITED STATES PATENT OFFICE.

HARRY L. MASSER, OF LOS ANGELES, CALIFORNIA.

VOLUME INTEGRATOR.

Application filed December 23, 1925. Serial No. 77,256.

This invention relates to fluid measuring devices for measuring quantities of gas or other fluids flowing through pipe lines, conduits, etc., and applies particularly to a device for mechanically computing the quantity of fluid having passed through an orifice or other differential form of meter, as may have been recorded upon a graphic chart by curves registering the static and differential pressures of the fluid flowing through the said metering device, and also, incidentally, relates to a device for mechanically determining the square root of a product of two quantities.

In measuring gas or other fluids flowing through a pipe line or conduit, a common practice is to insert into the pipe line a plate or obstruction having in it an orifice, thereby providing a means for creating a differential of pressure on the two sides of the orifice or metering device, and allowing the gas or fluid to flow through the orifice or opening, and determining and recording the pressure of the fluid on each side of the orifice or metering device. It is also required to determine the relation or difference between the pressure on the inlet and on the outlet side of said orifice or metering device. This relation is usually designated as the differential pressure, and represents the drop or loss of pressure of the fluid in flowing through the meter. Machines have heretofore been constructed for automatically measuring and recording these several pressures, as exist at the inlet and outlet sides of an orifice, or other similar meter, when measuring the flow of a fluid through it. The graphic record of such pressures is ordinarily recorded upon the circular chart, which chart is caused to rotate at a predetermined speed, usually one revolution per 24 hours, and so arranged that the meter gauge mechanism records the variations of pressures during the time of operation. In determining from the graphic chart the quantity of gas flowing through the pipe, and through the orifice or other meter, it is necessary to compute the velocity or rate of flow at various instants. This rate of flow is found by solving a formula, which is a constant multiplied by the square root of the product of the absolute fluid pressure at the orifice or meter, times the differential pressure drop across the inlet and outlet of the meter. The constant includes various factors, such as the co-efficient of the orifice or meter, the variation according to the temperature, density of the flowing fluid, the base to which computations are to be reduced, and the like. In solving this problem, it has heretofore been the common practice to select the various time intervals upon the chart, compute the product represented by the static pressure times the differential pressure, extract the square root of this product, and multiply this result by the meter co-efficient, and after all of the above results have been determined for the various time intervals, these results were added together, thus giving a final result representing the total volume of fluid having passed through the meter. It will readily be understood that this method of computing the product of two quantities and then extracting its square root is extremely laborious and is subject to error.

Consequently, one of the objects of this invention is to provide a device which will mechanically extract the square root of the product.

Another object of the invention is to provide a device on which a chart can be positioned and which has pointers, which can be made to follow the pressure and differential curves on the chart during the rotation of the chart and which device will not only mechanically extract the square root of the product of the pressures and differentials, but will sum up these average or instantaneous square roots so that the true average can be determined rather than determining the average of the sum which is subject to error.

With the foregoing and other objects in view which will be made manifest in the following detailed description and specifically pointed out in the appended claims, reference is had to the accompanying drawings for an illustrative embodiment of the invention, wherein:

Figure 1 is a plan view, parts being broken away, illustrating the device with a chart positioned thereon, Fig. 2 is a vertical section through the device taken substantially on the line 2—2 of Fig. 1, Fig. 3 is a vertical section on a somewhat enlarged scale taken substantially on the line 3—3 of Fig. 1, Fig. 4 is a sectional view taken on the line 4—4 of Fig. 1, and Fig. 5 is a vertical section taken on the line 5—5 of Fig. 2.

Referring to the accompanying drawings wherein similar reference characters designate similar parts throughout, the device consists of a suitable container having a bottom 10, side walls 11 and a top 12, in which top there is arranged a fairly large central aperture. Supported on the bottom 10 are three standards 13, 14 and 15. The standards 13 and 14 have their upper ends connected by a bar 16 which adjacent its center is connected to bars 17 mounted on the standard 15. A small shaft or spindle 18 is vertically disposed and rotatably mounted on the bars 17. On the upper end of this spindle there is mounted a disc 19 on which the chart C is adapted to be positioned. On the lower end of the spindle 18 there is mounted a second disc 20 which presents on its under side a hard, smooth, polished surface. The discs 19 and 20 are rigidly fastened upon the spindle 18 so that both will be rotated together. These discs are caused to rotate slowly through exactly one revolution in any suitable manner, such as by a spring motor 21 adapted to be wound by a crank 22. The spring motor may have a roller or equivalent construction as shown at 23 engaging upon the periphery of the lower disc 20, so as to cause both discs to simultaneously rotate, and the chart C to rotate with the upper disc 19. As shown upon Fig. 1, the chart C has approximately radially curved axes of ordinates and has circular axes of abscissæ. The chart shows two curves upon it, the curve P being the curve of pressure variations and the curve D representing the various differentials. As previously stated, the manner in which the curves P and D are recorded on the chart is not the subject matter of this invention and is immaterial so far as this device is concerned.

The problem presented in this invention is to ascertain the average of the square root of the product of the quantities represented by the curves P and D. A standard 24 is mounted on the bottom 10, and on this standard are pivotally mounted two pointers 25 and 26. The standard 24 is so arranged that the two pointers 25 and 26 will swing about a center which is the center of curvature of the axes of ordinates of the chart C, when these axes of ordinates are positioned beneath the ends of the pointers. In other words, if the pointers 25 and 26 are swung from side to side, their ends will exactly follow the curved axes of ordinates on the chart. The pointers 25 and 26 are used to trace or follow their respective curves D and P during the rotation of the discs 19 and 20. Their movement is transmitted to the device which mechanically determines the square root of the product.

The principle on which this device operates is developed from the geometrical proposition that the length of the perpendicular drawn from the hypotenuse of a right angled triangle as a base and which passes through the right angle of the triangle is equal to the square root of the product of the two segments into which the hypotenuse is divided or formed by the perpendicular.

Two standards 27 and 28 are mounted upon the bottom 10 inwardly of the standards 13 and 14. On these standards there are positioned two rails 29 which form a guide or two oppositely extending guides which extend in opposite directions from beneath the spindle 18. Carriages 30 and 31 are slidable upon the rails 29 and are arranged upon opposite sides of the spindle 18. A pair of similar rails 32 are arranged at right angles to the rails 29. One end of each of these rails is fastened to the standard 15 and the other end of each of the rails 32 is supported upon a standard 33. These rails are arranged beneath the spindle 18 and form a guide at right angles to the guide provided by the rails 29. A carriage 34 is slidable upon the rails 32.

A member providing a right angle is associated with the construction, this member preferably being formed of three rods indicated at 35, 36 and 37. These rods have their ends rigidly connected together to form a triangle having a right angle. This right angle is formed between the rods 35 and 36 and the connecting construction between the rods 35 and 36 forms the apex of the right angle and is pivotally secured to the carriage 34. The rod 37 acts to complete the triangle and serves as a brace for maintaining the rods 35 and 36 at a right angle. On the carriages 30 and 31 there are pivotally mounted U-shaped yokes 38 and 39 respectively. In the upstanding arms of these yokes there are formed apertures and the rod 35 slidably extends through the yoke 38 while the rod 36 slidably extends through the apertures in the yoke 39. Consequently, by shifting the carriages 30 and 31 upon the guide rails 29, the triangular member can be adjusted and will be caused to move either toward the right or the left upon Fig. 1 or to swing about the carriage 34 as a center, depending upon what movements are imparted to the carriages 30 and 31. It will be noted that movements of the carriages 30 and 31 can cause the triangular member to shift the carriage 34 upon the rails 32. The guide rails 29 form the hypotenuse of a right angled triangle, while the guide rails 32 form the perpendicular of the triangle which is drawn from its hypotenuse through the apex of the right angle. Therefore, the distance between the intersection of the center lines of the guide rails 29 with the guide rails 32 to the position of the central vertical pivot of the carriage 34 is equal to the square root of the product of the distance from the intersection of the center lines of the guide rails 29 and 32 to the carriage 30 times the distance from this point of intersection to the carriage 31. Accordingly, if the carriage 30 is placed upon the guide rail 29 in such a position that the distance between the vertical pivot of this carriage and the point of intersection of the center lines of the guide rails is proportional to one of the quantities to be multiplied, and the carriage 31 is similarly positioned so that the distance between it and the point of intersection of the guide rails is proportional to the other quantity, the carriage 34 will be caused to assume a position so that the distance between the center line of its vertical pivot and the point of intersection of the center lines of the guide rails is equal to the square root of the product of the qaunties.

As a means for determining the average position of the carriage 34 upon the guide rails 32 during the rotation of the chart C, a squared shaft 40 has one end rotatably mounted in the standard 15 and carries a beveled pinion 41. On the carriage 34 there is rotatably mounted a wheel 42 which is slidable on the squared shaft 40. The periphery of this wheel is adapted to engage the smooth, polished surface on the under side of the disc 20 and will therefore be rotated by the disc 20. It will be noted that the intersection of the guide rails 29 and 32 is not directly below the spindle 18, but is a short distance to the left of it. Consequently, the contacting edge of the wheel 42, which engages the under side of the disc 20, is spaced from the apex of the right angle a distance equal to the distance between the spindle 18 and the intersection of the guide rails. This construction compensates for the space between the intersection of the guide rails and the axis of rotation of the chart. Obviously, as the guide rails 32 are arranged radially with respect to the axis of rotation of the chart, the carriage 34 may move inwardly and outwardly upon its guide rails 32 and cause the wheel 42 to merely slide on the disc 20. The speed at which the wheel 42 is rotated depends upon its position from the axis of rotation of the disc 20. If the square root of the product is small, the carriage 34 will be adjacent the guide rails 29 and the wheel 42 will engage the disc 20 near its center, so that upon rotation of the disc, the wheel 42 will be rotated a relatively small number of revolutions. If the square root of the product is large, however, the wheel 42 will engage the disc remote from its center and will accordingly be rotated a greater number of revolutions during the rotation of the disc 20. The shaft 40 is caused to rotate with the wheel 42, and as it has its beveled pinion 41 meshing with a beveled pinion 43 on a vertical shaft 44, the vertical shaft may be rotated a number of revolutions corresponding to the number of revolutions of the wheel 42. The vertical shaft 44 carries a gear 45 meshing with a gear 46 on a counting device 47 which may be of any desired construction. The vertical shaft 44 is provided with a handle 48 and with a spring 49 urging it upwardly to maintain the beveled pinions 43 and 41 in engagement and the gears 45 and 46 in engagement. On the counting device there is arranged a second gear 50 engageable by a gear 51 on the vertical shaft, so that by pressing the vertical shaft downwardly against the action of the spring 49, the beveled pinions 43 and 41 can be disengaged and the gears 45 and 46 can be disengaged. The gears 50 and 51 will be engaged and this permits a resetting of the counting device.

By calibrating the counting device, it will readily be appreciated that it can be caused to indicate the complete number of revolutions made by the wheel 42 during one complete revolution of the chart C, and accordingly the average square root of the product of the two curves P and D can be determined for the complete rotation of the chart C, thus giving the average square root of the product for the time taken in recording the chart C.

The construction for shifting the carriages 30 and 31 is as follows: On the bottom 10 there is mounted a standard 52 on which is pivotally mounted an angular lever 53. The end of the lever 53 extends across the bottom 10 and is arranged adjacent the guide rails 29. Its end is bent upwardly and extends through an arcuate slot 54 in the top 12 and is provided with a handle 55. A link 56 is pivotally secured to the lever 53 and to the carriage 31. An arm 56' is rigid with the pointer 26 and a link 57 pivotally connects the end of the arm to the end of the lever 53. Accordingly, by shifting the handle 55 the pointer 26 can be swung to be coincident with the pressure curve P during the rotation of the chart C, and as the lever which swings the pointer 26 is also connected to the carriage 31, the carriage 31 will be shifted along the guide rails 29 corresponding to the movements of the pointer.

The construction for shifting the carriage 30 is of a slightly different construction from that for shifting the carriage 31 for the following reasons: The conventional manner of recording the charts C is to use two different scales of ordinates. Usually one inch of ordinate of the pressure curve P will be equal to about 20 lbs. of pressure. If the differential curve D were recorded upon the same scale, the carriage 30 could be shifted in a generally similar manner to the carriage 31. However, this is not the case, as the differential curve is usually recorded on a scale where one inch of ordinate equals about 10 inches of differential. Consequently, there must be some compensating movement for shifting the carriage 30 to reduce or proportion the scales of the two curves to the required base. A standard 58 is mounted upon the bottom 10 and a lever 59 has a link 60 pivotally connected to it and to the standard 58. This lever extends across the bottom 10 beneath the guide rails 29 and has its end extending upwardly through an arcuate slot 61 in the top 12. It is provided with a handle 62. The arm 63 formed upon this lever is connected to the arm 64 on the pointer 25 by means of a link 65. In this manner by shifting the handles 62 the pointer 25 can be swung to be caused to follow the differential curve D. Parallel to the guide rails 29 there is arranged a track 66 which is supported upon standards 67 and which has mounted thereon a carriage 68 carrying a rack 69. Immediately below the guide rails 29 there is provided a track 70, and a carriage 71 is movable thereon and carries a rack 72. A suitable standard 73 is provided between the two tracks 66 and 70, and rotatably mounted on this standard are two gears 74 and 75. These gears are of the two to one ratio, that is, the gear 74 is of a diameter twice that of the gear 75. The gear 75 meshes with the rack 69 while the gear 74 meshes with the rack 72. The lever 59 is connected by a suitable link to the carriage 68, so that upon movement of the lever 59 to cause the pointer 25 to follow the curve D, the carriage 68 will be caused to shift upon the track 66 to a coresponding amount. However, if the curve D is on a scale which is one-half of the scale of the curve P, the carriage 30 must be shifted twice the amount of the shifting of the carriage 68, so as to reduce the distance which it is from the intersection of the guide rails 29 and 32 to the same scale as the distance between the carriage 31 and the intersection of the guide rails. Accordingly, when the carriage 68 is moved, its movement is multiplied through the gears 74 and 75 in transmitting the movement to the carriage 71. The carriage 30 is secured to the carriage 71 and will in this manner be caused to move the proper amount to reduce the quantities to the same scale. This last mentioned construction for multiplying the movement of the carriage 30 can be omitted if a chart is used in which the curve D is recorded upon the same scale as the curve P is recorded. However, as the conventional way of recording these charts is as above stated, this construction is preferably employed.

If the differential curve D should be recorded upon other scales than that which is just half of the scale of the pressure curve P, the ratios of the diameters of the gears 74 and 75 can be varied accordingly. In order to facilitate the shifting of the carriages and the shifting of the triangular member, a suitable tension element 76 may be secured to the connecting construction arranged between the rods 35 and 36. This element is flexible and is adapted to be maintained tight by a spring roller 77 mounted on the standard 15. In this manner the triangular member will be urged toward the standard 15 and will facilitate its shifting and the shifting of the carriages, effectively preventing any binding between the rods 35 and 36 and their respective yokes 38 and 39.

From the above described construction it will readily be appreciated that a device has been provided wherein the charts C can be easily and quickly placed upon the disc 19, the pointers 25 and 26 caused to follow their respective curves by the handles 55 and 62 and the average result of the square root of the product of the pressure times differential can be easily and quickly determined, eliminating the laborious computations heretofore required and which were subject to errors.

It will be understood that various changes in the detail of construction may be made without departing from the spirit or scope of the invention as defined by the appended claims.

I claim:

1. A mechanical device for obtaining the square root of the product of two quantities comprising three guides, two of said guides extending in opposite directions from the third guide and being arranged at right angles thereto, carriages movable upon all of said guides, and two members having their ends rigidly connected together at right angles and connected to the carriage on the third guide, said members being slidable upon the carriages on the oppositely extending guides.

2. A mechanical device for obtaining the square root of the product of two quantities comprising three guides, two of said guides extending in opposite directions from the third guide and being arranged at right angles thereto, carriages movable upon all of said guides, two members having their ends rigidly connected together at right angles and connected to the carriage on the third guide, said members being slidable upon the carriages on the oppositely extending guides, and means for shifting the last mentioned carriages on their guides distances from the third guide correspondingly to the quantities multiplied whereby the square root of the product may be determined from the position assumed by the carriage on the third guide.

3. A mechanical device for obtaining the square root of the product of two quantities comprising means providing two intersecting axes arranged at right angles, a member providing a right angle adjustable relatively to said means, means for maintaining the apex of the right angle on one axis, and means for adjusting the member so that the positions at which the sides of the right angle cross the other axis may be varied correspondingly to the various quantities multiplied whereby the square root of their product may be ascertained from the position of the apex of the right angle on its axis.

4. A mechanical device for ascertaining the square root of the product of two quantities comprising two guides arranged at right angles to each other, two carriages movable on one of said guides upon opposite sides of the other guide, a third carriage movable upon the said other guide, a member mounted upon said carriages providing a right angle having its apex pivotally secured to the third carriage and its sides slidable on the first mentioned two carriages, said member being adjustable so that the locations where the sides of the right angle cross the first guide may be varied correspondingly to the quantities to be multiplied, thus shifting the position of the apex of the angle on the other guide, so that the square root of the product of the quantities may be determined therefrom.

5. A mechanical device for ascertaining the square root of the product of two quantities comprising two guides arranged at right angles to each other, two carriages movable on one of said guides upon opposite sides of the other guide, a third carriage movable upon the said other guide, a member mounted upon said carriages providing a right angle having its apex pivotally secured to the third carriage and its sides slidable on the first mentioned two carriages, and means for adjusting the positions of the first mentioned carriages on their guide corresponding to the magnitudes of the quantities to be multiplied so as to shift the position of the third carriage on its guide and thus determine the square root of the product.

6. A device of the class described comprising a disc on which a chart is adapted to be placed bearing two curves representing the magnitudes of two variable quantities, means for moving said disc, two pointers, means for causing said pointers to traverse their respective curves during the rotation of the disc and chart, and mechanical means associated with said pointers for determining the average of the square root of the product of said quantities during the rotation of the disc.

7. A device of the class described comprising a disc on which a chart is adapted to be mounted, means for rotating said disc, two pointers movable over said disc, two guides arranged at right angles, two carriages movable upon one of said guides on opposite sides of the other guide, a third carriage movable upon said other guide, a member providing a right angle having its apex secured to the third carriage and its sides adjustable upon the first mentioned two carriages, means connecting the two carriages to said pointers whereby when the pointers are moved, their respective carriages will move in a corresponding manner producing movement of the third carriage, a wheel rotatably mounted upon the third carriage, a second disc rigid with the first disc adapted to have its side face engage said wheel so as to rotate it, and means for registering the number of resolutions made by said wheel.

8. A device of the class described comprising a disc on which a chart is adapted to be positioned which bears two curves representing the magnitudes of variable quantities, means for rotating said disc, two pointers movable over said disc, two guides arranged at right angles, two carriages movable upon one of said guides upon opposite sides of the other guide, a third carriage movable upon said other guide, a member providing a right angle having its apex secured to the third carriage and its sides slidable upon the first mentioned two carriages, means connecting one of said pointers to one of said two carriages, whereby it may be moved correspondingly to the movement of the pointer, a rack connected to the other pointer, a pinion meshing with the rack, a gear adapted to be driven by the pinion, a rack meshing with the gear and connected to the other of said two carriages providing for a movement which will be proportional to the movement of said other pointer whereby when said two carriages are moved, the third carriage will also be adjusted, a second disc rotatable with the first disc, a wheel mounted upon the third carriage engageable upon a side face of said second disc so as to be rotated thereby, and means for registering the number of revolutions of said wheel.

9. A device of the class described comprising two guides arranged at right angles, two carriages movable over one of said guides on opposite sides of the other guide, a third carriage movable over the other guide, a member providing a right angle having its apex pivotally secured to the third carriage and having its sides slidable upon said two carriages, means for shifting the two carriages in the desired manner and thus shift the third carriage, a rotatable disc, means for rotating said disc, a wheel mounted on said third carriage rotatable about an axis parallel to a radius of the disc, said wheel engaging said disc so as to be rotated thereby, and means for registering the number of revolutions made by said wheel.

10. A device of the class described comprising a support on which a chart is adapted to be placed bearing two curves representing the magnitudes of two variable quantities, means for moving the support and chart thereon, two pointers, means for causing said pointers to traverse their respective curves during the movement of the support and chart, and mechanical means associated with said pointers for determining the average of the square root of the product of the quantities represented by the curves during the movement of the chart.

In testimony whereof I have signed my name to this specification.

HARRY L. MASSER.